United States Patent
Reitmeier

[19]

[11] Patent Number: 6,118,498
[45] Date of Patent: Sep. 12, 2000

[54] CHANNEL SCANNING AND CHANNEL CHANGE LATENCY REDUCTION IN AN ATSC TELEVISION RECEIVER

[75] Inventor: Glenn Arthur Reitmeier, Yardley, Pa.

[73] Assignee: Sarnoff Corporation, Princeton, N.J.

[21] Appl. No.: 08/978,018

[22] Filed: Nov. 25, 1997

Related U.S. Application Data

[60] Provisional application No. 60/060,112, Sep. 26, 1997.

[51] Int. Cl.[7] .................................................. H04N 5/455
[52] U.S. Cl. ........................ 348/725; 348/727; 348/731; 348/732; 348/845; 455/182.3
[58] Field of Search .................................... 348/727, 725, 348/726, 731, 732, 432, 437, 845, 845.1, 845.2, 7, 12, 13, 10, 27, 441, 461, 473, 569, 565, 735, 734; 455/4.2, 5.1, 182.3, 186.1, 200.1, 180.1, 168.1, 151.4, 181.4, 186.2, 158.2, 166.1; 386/83–95; H04N 5/455

[56] References Cited

U.S. PATENT DOCUMENTS

| | | | |
|---|---|---|---|
| 4,164,711 | 8/1979 | Steckler et al. | 325/464 |
| 4,706,121 | 11/1987 | Young | 358/142 |
| 4,737,993 | 4/1988 | Devilbiss | 455/180 |
| 4,748,684 | 5/1988 | Wright, Jr. | 455/182 |
| 5,311,317 | 5/1994 | Ogura et al. | 340/725 |
| 5,557,422 | 9/1996 | Nishigaki et al. | 358/335 |
| 5,583,560 | 12/1996 | Florin et al. | 348/7 |
| 5,617,151 | 4/1997 | Lee | 348/731 |
| 5,621,456 | 4/1997 | Florin et al. | 348/7 |
| 5,631,743 | 5/1997 | Inoue | 386/95 |
| 5,652,623 | 7/1997 | Takano | 348/384 |
| 5,841,472 | 11/1998 | Rim et al. | 348/845 |
| 5,874,995 | 2/1999 | Naimpally et al. | 348/845.2 |
| 5,886,736 | 3/1999 | Chen | 348/845.2 |
| 5,910,960 | 6/1999 | Claydon et al. | 371/37.11 |
| 5,917,537 | 6/1999 | Lightfoot et al. | 348/7 |
| 5,926,232 | 7/1999 | Mangold et al. | 348/845.1 |
| 5,933,192 | 8/1999 | Crosby et al. | 348/387 |

OTHER PUBLICATIONS

Advanced Television Systems Committee, Program/Episode/Version Identification ARSC Standard, entire document, Aug. 30, 1996.
PCT Search Report Feb. 03, 1999.

*Primary Examiner*—John K. Peng
*Assistant Examiner*—Linus H. Lo
*Attorney, Agent, or Firm*—William J. Burke

[57] ABSTRACT

A method and apparatus for masking program selection latency in an MPEG-like information stream receiver, such as an ATSC or DVB television receiver. An information stream receiver receives VSB- or QAM-modulated signals comprising an MPEG-like system streams including program transport streams. In a channel scanning mode of operation, a plurality of identified program transport streams (i.e., channels) are sequentially retrieved from one or more system streams. A portion of each retrieved program transport stream, such as an intra-frame encoded video frame within an included elementary video stream, is extracted and stored in a memory. In a channel changing mode of operation, if a desired channel is one of the sequentially scanned channels, then the stored I-frame is retrieved and coupled to a decoder while the desired channel is re-acquired by tuning, demodulating, and demultiplexing operations. In this manner, the inherent latency of the tuning, demodulating, and demultiplexing operations are somewhat masked. Moreover, by storing tuning and demodulation parameters associated with an anticipated "next" channel, the actual time required to retrieve that channel is reduced.

22 Claims, 3 Drawing Sheets

CHANNEL SCANNING AND CHANNEL CHANGE LATENCY REDUCTION IN AN ATSC TELEVISION RECEIVER

This invention claims priority from U.S. Provisional Application No. 60/060112, filed Sep. 26, 1997, and incorporated herein by reference in its entirety.

The invention relates to television receivers generally, and more particularly, television receivers capable of receiving an ATSC-like television signal.

BACKGROUND OF THE DISCLOSURE

Consumers have become accustomed to the rapid channel change capabilities of present-day NTSC (National Television Standards Committee) television receivers. Such television receivers change channels by changing a tuner frequency (i.e., tuning), and acquiring a television signal modulated onto the tuner frequency (i.e., synchronizing). The predominant time delay in an NTSC television receiver channel change operation is the time required to change the tuner frequency. Acquiring picture synchronization is extremely rapid, since horizontal and vertical synchronization information occurs frequently (i.e., 63 microseconds and 33 milliseconds, respectively) in an NTSC television signal.

In the relatively near future, the type of television receiver used by consumers will be radically changed. Specifically, future television receivers are expected to be implemented substantially in accordance with the transmission standards established by the Advanced Television Standards Committee (ATSC). A similar standard in the European Digital Video Broadcasting (DVB) standard. A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference.

Unfortunately, changing channels in a television receiver conforming to the ATSC-like standards is inherently a much slower process than the above-described NTSC process. Specifically, an ATSC television receiver must sequentially perform many steps to acquire a television signal and produce a series of images from that signal. First, a tuner frequency must be adjusted to a frequency allocated to the channel of interest. Second, the VSB or QAM demodulator must perform a carrier recovery process to begin to produce valid output data. Third, the vestigial sideband (VSB) or quadrature amplitude modulated (QAM) demodulator must acquire data field and data segment synchronization information. Fourth, a transport decoder must acquire packet synchronization information, and then decode so-called program map tables (PMT) and program access tables (PAT) to deliver video and audio data to the respective decoders. Fifth, video rate buffers must be loaded with the video data corresponding to the channel of interest. Sixth, the video decoder begins to perform variable length decoding (VLD), converting the bit stream into instructions and data suitable for use in subsequent decoding steps. Seventh, a video decoder must wait for the, occurrence of an intra-coded frame (I-frame) in the data stream before picture decompression can begin. The rate of I-frame occurrence is controlled by a television broadcaster's compression encoder, though the rate will likely be one I-frame per each 12 frame group of pictures (GOP) transmitted. Thus, the average latency for video acquisition alone will be on the order of six frames (approximately 200 milliseconds) and the worst case latency for video acquisition alone will be on the order of 12 frames (approximately 400 milliseconds). It is believed that such a high latency channel change operation will be unacceptable to consumers.

Therefore, it is seen to be desirable to provide a method and apparatus for providing a rapid, or seemingly rapid, channel change or channel acquisition capability in a ATSC television receiver.

SUMMARY OF THE INVENTION

The invention is a method and apparatus for masking program selection latency in an MPEG-like information stream receiver, such as an ATSC or DVB television receiver.

Specifically, an information stream receiver receives VSB- or QAM-modulated signals comprising an MPEG-like system streams including program transport streams. In a channel scanning mode of operation, a plurality of identified program transport streams (i.e., channels) are sequentially retrieved from one or more system streams. A portion of each retrieved program transport stream, such as an intra-frame encoded video frame within an included elementary video stream, is extracted and stored in a memory. In a channel changing mode of operation, if a desired channel is one of the sequentially scanned channels, then the stored I-frame is retrieved and coupled to a decoder while the desired channel is re-acquired by tuning, demodulating, and demultiplexing operations. In this manner, the inherent latency of the tuning, demodulating, and demultiplexing operations are somewhat masked. Moreover, by storing tuning and demodulation parameters associated with an anticipated "next" channel, the actual time required to retrieve that channel is reduced.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an ATSC television receiver. However, it will be apparent to those skilled in the art that the invention is applicable to any receiver of segmented information streams, such as DVB MPEG-1, MPEG-2 and other information streams.

Figure 1:
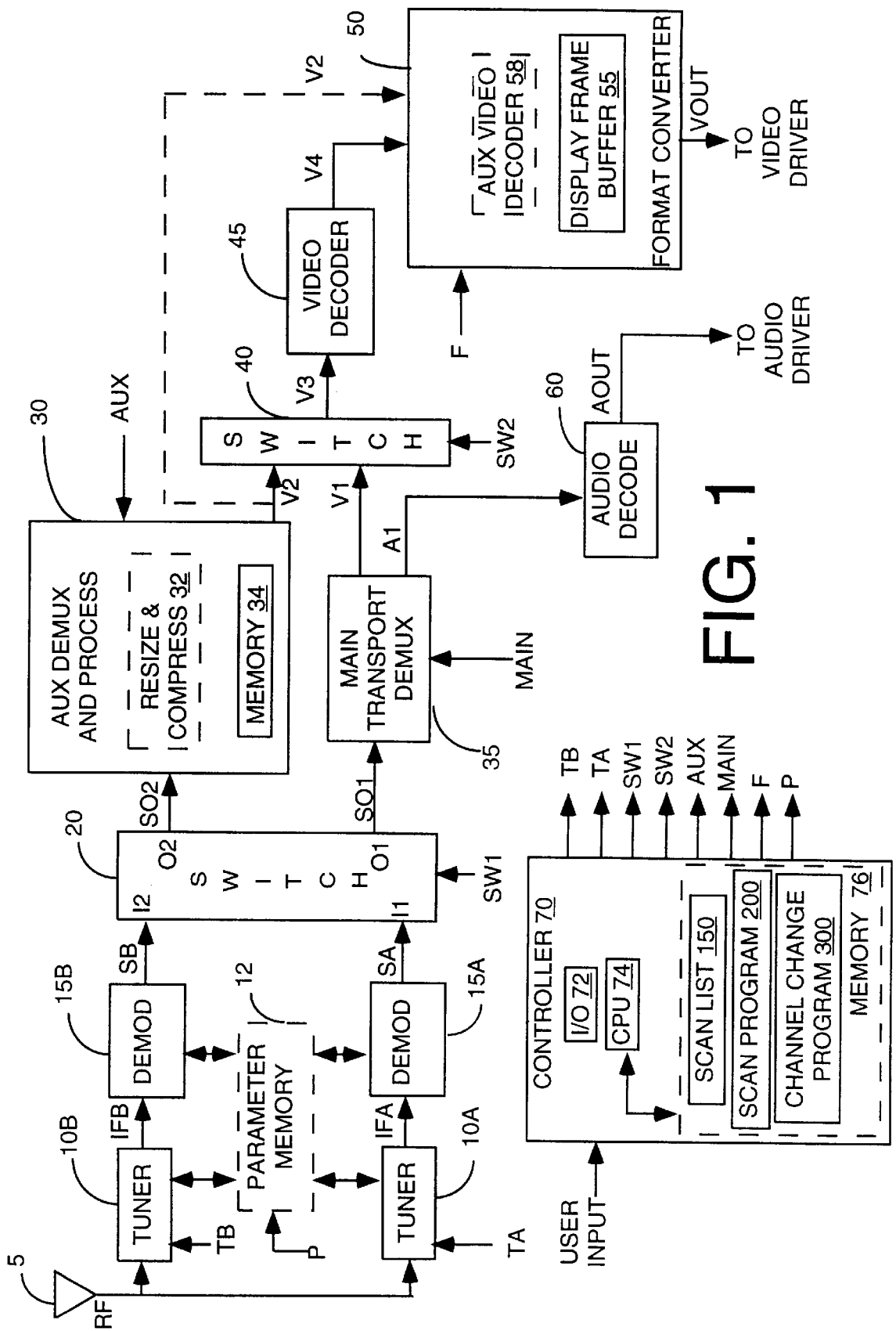
FIG. 1 depicts a high-level block diagram of an ATSC receiver 100 according to the invention.

FIG. 1 shows high-level block diagram of an ATSC receiver 100 according to the invention. The receiver 100 includes a controller 70 comprising a central processing unit (CPU) 74 that is coupled to an input/output (I/O) port 72 and a memory unit 76. The controller utilizes the I/O port 72 to receive user input commands from, e.g., a remote control unit (not shown) and provide a plurality of control signals to control various portions of the receiver 100. The user input commands include standard television receiver commands, such as change channel, change volume, adjust picture and the like. The memory unit 76 is used to store, inter alia, programs and associated data structures used by the CPU 74, including a channel scanning program 200, a channel changing program 300 and an associated scan list 150.

The channel scanning program 200 will be described in more detail below with respect to FIG. 2. Briefly, when running the channel scanning program 200, the controller 70 causes an auxiliary processing portion of the receiver to repeatedly tune, demodulate and decode some or all of a group of 4 channels identified in the scan list 150. At least a portion (e.g., a video I-frame) of each decoded channel is stored for subsequent retrieval.

The channel changing program 300 will be described in more detail below with respect to FIG. 3. Briefly, when running the channel changing program 300, the controller 70 causes a main processing portion of the receiver to tune, demodulate and decode a new channel in response to a user input (e.g., a channel change request). If the new channel is one of the channels included in the scan list 150, then the controller 70 causes the auxiliary processing portion to retrieve the most recently stored I-frame associated with the new channel. The retrieved I-frame is then decoded and displayed. Contemporaneously, the audio portion of the new channel is decoded and sent to an audio output device. This approach provides the illusion of rapid responsiveness, in spite of the real latency that is inherent in an ATSC television receiver channel change.

Referring to FIG. 1, an RF source 5 (illustratively, an antenna or cable television distribution network), provides a radio frequency (RF) signal comprising a plurality of television signals modulated according to a vestigial sideband (VSB), quadrature amplitude modulation (QAM) or other suitable modulation scheme. The provided RF television signals are coupled to a first tuner 10A and a second tuner 10B. First tuner 10A, in response to a control signal TA, downconverts a desired television signal to produce a first intermediate frequency (IF) television signal IFA. A first demodulator 15A, illustratively a VSB or QAM demodulator, demodulates the first IF television signal IFA to produce a first MPEG-like system stream SA. The first tuner 10A and first demodulator 15A form a first tuner/demodulator pair.

A second tuner 10B, in response to a control signal TB, downconverts a desired television signal to produce a second intermediate frequency (IF) television signal IFB. A second demodulator 15B, illustratively a VSB demodulator, demodulates the second IF television signal IFB to produce a second MPEG-like system stream SB. The second tuner 10A and second demodulator 15A form a second tuner/demodulator pair. The first and second tuner/demodulator pairs operate in substantially the same manner.

The first and second system streams SA, SB are coupled to respective first I1 and second I2 inputs of a first switch 20. First switch 20, in response to a control signal SW1 from the controller 70, couples one of the first and second system streams SA, SB to a first output O1 as a first output stream SO1. First switch 20, in response to the control signal SW1 from the controller 70, couples one of the first and second system streams SA, SB to a second output O2 as a second output stream SO2. The first switch 20 may couple either input stream SA. SB to either (or both) outputs O1, O2.

The first and second system streams SA, SB comprise MPEG-like system streams that may contain one or more MPEG-like program streams. The MPEG-like program streams are analogous to NTSC channels, in that each program stream typically transports the video and audio portions of a single program, such as a movie or other audio-visual program. Each program stream comprises a plurality of elementary streams associated with the video and audio portions of the transported audio-visual program.

A main transport demultiplexer 35 receives the first output stream SO1 from first switch 20. Main transport demultiplexer 35, in response to a control signal MAIN from the controller 70, extracts a particular program stream from the received system stream SO1. Elementary video stream(s) V1 associated with the extracted program stream are coupled to a second switch 40. The elementary audio stream(s) A1 associated with the extracted program stream are coupled to an audio decoder 60. The audio decoder 60 decodes the elementary audio stream(s) and couples the decoded audio information to an audio driver circuit (not shown).

An auxiliary demux and processing unit 30 receives the second output stream SO2 from first switch 20. The auxiliary demux and processing unit 30, in response to a control signal AUX from the controller 70, operates in a picture-in-picture mode, a channel scanning mode or a channel changing mode. It should be noted that the circuitry (or software) used to implement a PIP processor is very similar to the circuitry (or software) used to provide the channel scanning and rapid channel acquisition functions of the invention. Therefore, the auxiliary demux and processing unit 30 will be described within the context of a PIP processing environment. However, the below-described PIP operations are not required to practice the invention.

In the PIP mode of operation, auxiliary demux and processing unit 30 receives a system stream SO2, demultiplexes a desired program stream from the received system stream SO2, and retrieves a video elementary stream from the demultiplexed program stream. The retrieved video elementary stream is then coupled to the second switch 40 and, optionally, a format converter 50, as second video stream V2.

Second switch 40, in response to a control signal SW2 from the controller 70, selectively couples either the first V1 or second V2 elementary video stream to a video decoder 45, illustratively an MPEG video decoder, as video stream V3. Video decoder 45 decodes the selected video steam V3 in a known manner to produce a resultant video stream V4, illustratively a decoded (i.e., decompressed) video stream.

Format converter 50 receives the decoded video stream V4 and, optionally, the second elementary video stream V2. Format converter 50 includes a display frame buffer 55 and, optionally, an auxiliary video decoder 58. The format converter 50, in response to a control signal F from controller 70, operates in a "pass-through" mode of operation, a channel changing mode of operation of a PIP mode of operation to produce an output video stream VOUT. The output video stream VOUT is coupled to a video driver circuit (not shown) that processes the stream to produce an image on a display device (not shown).

In the "pass-through" mode of operation, format converter 50 couples the decoded video stream V4 to the video driver circuit as the output video stream VOUT. The display frame buffer 55 may be used to store, e.g., a single decoded frame. The stored single decoded frame, when coupled to the video driver and display, will result in a "frozen" image of the stored frame.

In the channel changing mode of operation, format converter 50 utilizes display frame buffer 55 to store a single video frame while the tuner/demodulator pair associated with the main transport demultiplexer 35 tunes and demodulates a new channel. The resulting video output signal VOUT represents a freeze-frame image of the stored frame. The single video frame is either the last frame of the old channel or, if the new channel is included in the scan list 150, a recent frame from the new channel. If the new channel is in the scan list then the recent frame is received from auxiliary demux and processing unit 30 directly via optional signal path V2, or via switch 40 and decoder 45 as decoded video stream V4. The channel changing mode of operation will be described in more detail below, with respect to FIG. 3.

In the PIP mode of operation, format converter 50 decodes, using optional auxiliary video decoder 58, at least a portion of the second elementary video stream V2 to produce a fully decoded or partially decoded auxiliary stream. The partially decoded auxiliary stream may comprise, e.g., only the video information included within the I-frames of the second elementary video stream V2. While such an auxiliary stream will produce a jerky image when displayed (since a typical ATSC stream includes one I-frame in each 12 frame GOP), this may be sufficient for a PIP application. Moreover, the complexity of the auxiliary video decoder 58 is greatly reduced if only I-frames need to be decoded. The full or partially decoded auxiliary stream is then reformatted using, e.g., a subsampling operation to reduce the amount of video information (i.e., reduce the size of a resulting image). The reformatted auxiliary stream is then merged with the decoded video stream V4 to produce the output stream VOUT. The displayed image resulting from the merged stream will comprise a main image associated with decoded video stream V4, and a size-reduced image associated with the reformatted auxiliary stream.

In the channel scanning mode of operation, auxiliary demux and processing unit 30 receives a system stream SO2, demultiplexes a desired program stream from the received system stream SO2, and retrieves a video elementary stream from the demultiplexed program transport stream. The video elementary stream is then parsed to identify one or more I-frames within the video elementary stream. Each time an I-frame is identified, the identified I-frame is stored in a location in memory 34 associated with the particular program stream. Thus, the memory location is constantly overwritten with a new I-frame each time a new I-frame is identified. This process continues until the controller 70 causes the auxiliary demux and processing unit 30 to demultiplex a new video elementary stream from within, typically, a new program transport stream or to change the physical channel using the appropriate tuner. I-frames within the new video stream are identified in the above-described manner, and stored in a location in memory 34 associated with the new program transport stream. The change in streams is easily noted by, e.g., examining the packet identifications (PIDs) included in the headers of both transport and packetized elementary stream (PES) packets. The channel scanning mode of operation will be described in more detail below, with respect to FIG. 2.

In the channel changing mode of operation, auxiliary demux and processing unit 30 retrieves from memory 34, an couples to an output, the stored I-frame associated with a desired new main channel. The retrieved I-frame is coupled to video decoder 45 via second switch 40. The retrieved frame is identified by the controller 70 via the AUX signal. Optionally, the retrieved I-frame may be coupled directly to format converter 50 via optional path V2. The channel changing mode of operation will be described in more detail below, with respect to FIG. 3.

To conserve memory resources, auxiliary demux and processing unit 30 optionally includes a resize and compression unit 32. The resize and compression unit 32 resizes an I-frame prior to the storage of the I-frame. The resizing may be performed in the discrete cosine transfer (DCT) domain using the method described by Martucci in U.S. application Ser. No. 08/728459, filed Oct. 10, 1996, U.S. Pat. No. 5,845,015, issued Dec. 1, 1998, and incorporated herein by reference in its entirety. Alternatively, the frame (or frames) may be decoded and subsampled using only low-order DCT coefficients, then re-encoded and stored in the memory 34. In this manner the necessary size of memory 34 is advantageously reduced. Moreover, the need for auxiliary demux and processing unit 30 to use or control (i.e., coordinate with) the video decoder 45 or format converter 50 resources during the channel scanning or PIP operating modes is also reduced.

An exemplary scan list 150 is depicted in Table 1. Specifically, the scan list 150 depicted in Table 1 stores information necessary to retrieve each of 12 channels. This information includes a channel ID, tuner parameters, demodulator parameters, program transport stream PID, video elementary stream PID and audio elementary stream PID.

Two types of channel-related information are stored in the scan list, predetermined and variable. Predetermined channel-related information is that information derived from, e.g., a program associated table (PAT) or a program map table (PMT). For example, the nominal tuning frequency and the various transport, video and audio PIDs of a particular channel. Variable channel-related information is that information subject to change depending upon, e.g., signal propagation errors, thermal drift of components and other error sources. For example, associated with each tuner is a frequency drift correction parameter which is added to, or subtracted from, the nominal tuning frequency of a particular channel. In addition, coefficients for adaptive equalizers (not shown) within a tuner/demodulator pair are typically different for different channels.

It is important to note that by utilizing the predetermined and/or the variable channel-related information to retrieve a new channel in either a channel scanning operation or a channel changing operation, the actual time required to retrieve that channel is shortened. In a channel changing mode of operation, a previously-scanned desired new channel is associated with tuner and demodulator parameters that can be loaded directly into the main tuner/demodulator pair while a prior I-frame associated with the desired new channel is coupled to a display device. In this manner, the invention advantageously provides a means of both reducing and masking the channel change latency time.

The invention is also useful in changing to a new channel that is not on the scan list 150, if the new channel may be retrieved using tuner or demodulator parameters associated with a channel on the scan list 150. For example, if a new channel is within the same system stream as a scanned channel, then tuner and demodulator parameters associated with the scanned channel are directly applicable to the new channel. Moreover, some of the tuner and demodulator parameters relate to the actual hardware used to perform the tuning and demodulation functions. For example, frequency offsets and other error correction parameters within a tuner are likely to be similar for a large number of nominal carrier frequencies.

Referring to FIG. 1 an optional parameter memory 12 is depicted. The optional parameter memory may be used to store some or all of the items in the scan list 150. The optional parameter memory 12, in response to a control signal P from the controller 70, cooperates with both tuner/demodulator pairs (10A/15A and 10B/15B) to retrieve variable channel-related information. In addition, optional parameter memory 12 may be used to provide previously-retrieved variable channel-related information (i.e., information from the scan list 150) to the appropriate tuner/demodulator pair during either a channel scanning operation or a channel changing operation.

In the exemplary embodiment, there are 12 channels stored in the scan list 150 (there may, of course, be more or less channels stored in the scan list 150). The inventor has determined that these channels are the most likely channels to be selected next by a user. The first four channels included within the scan list 150 of the exemplary embodiment comprise the four most recently viewed channels. These are identified in Table 1 as recent, recent −1, recent −2, and recent −3.

The next four channels included within the scan list 150 of the exemplary embodiment are related to the presently-selected channel (i.e., the channel now being viewed). These are identified as the next, next +1, prior, and prior −1 channels. The next channel is simply the next channel a user would retrieve or select if the user was to increment a channel selection button on, e.g., a remote control device. The next +1 channel is the channel resulting from a second channel increment command. Similarly, the prior channel is a channel a user would select if a user were to decrement a channel selection button on, e.g., a remote control device. The prior −1 channel is the channel resulting from a second channel decrement command.

The final four channels included within the scan list 150 of the exemplary embodiment are simply four favorite channels. These channels may-be preprogrammed by a user or may be statistically determined over time by, e.g., observing a user's channel selection habits. For example, controller 70 includes a memory portion 76 which may be used to store a counter associated with each of the channels available to a particular user. Upon power up, the controller 70 may examine the counter list, identify the four highest count values, and store information relating to the four channels associated with the four highest count values in the scan list.

TABLE 1

| Channel ID | Tuner Parameters | Demodulator Parameters | Transport PID | Video PID(s) | Audio PID(s) |
|---|---|---|---|---|---|
| Recent | | | | | |
| Recent −1 | | | | | |
| Recent −2 | | | | | |
| Recent −3 | | | | | |
| Next | | | | | |
| Next + 1 | | | | | |
| Prior | | | | | |
| Prior-1 | | | | | |
| Favorite No. 1 | | | | | |
| Favorite No. 2 | | | | | |
| Favorite No. 3 | | | | | |
| Favorite No. 4 | | | | | |

Figure 2:
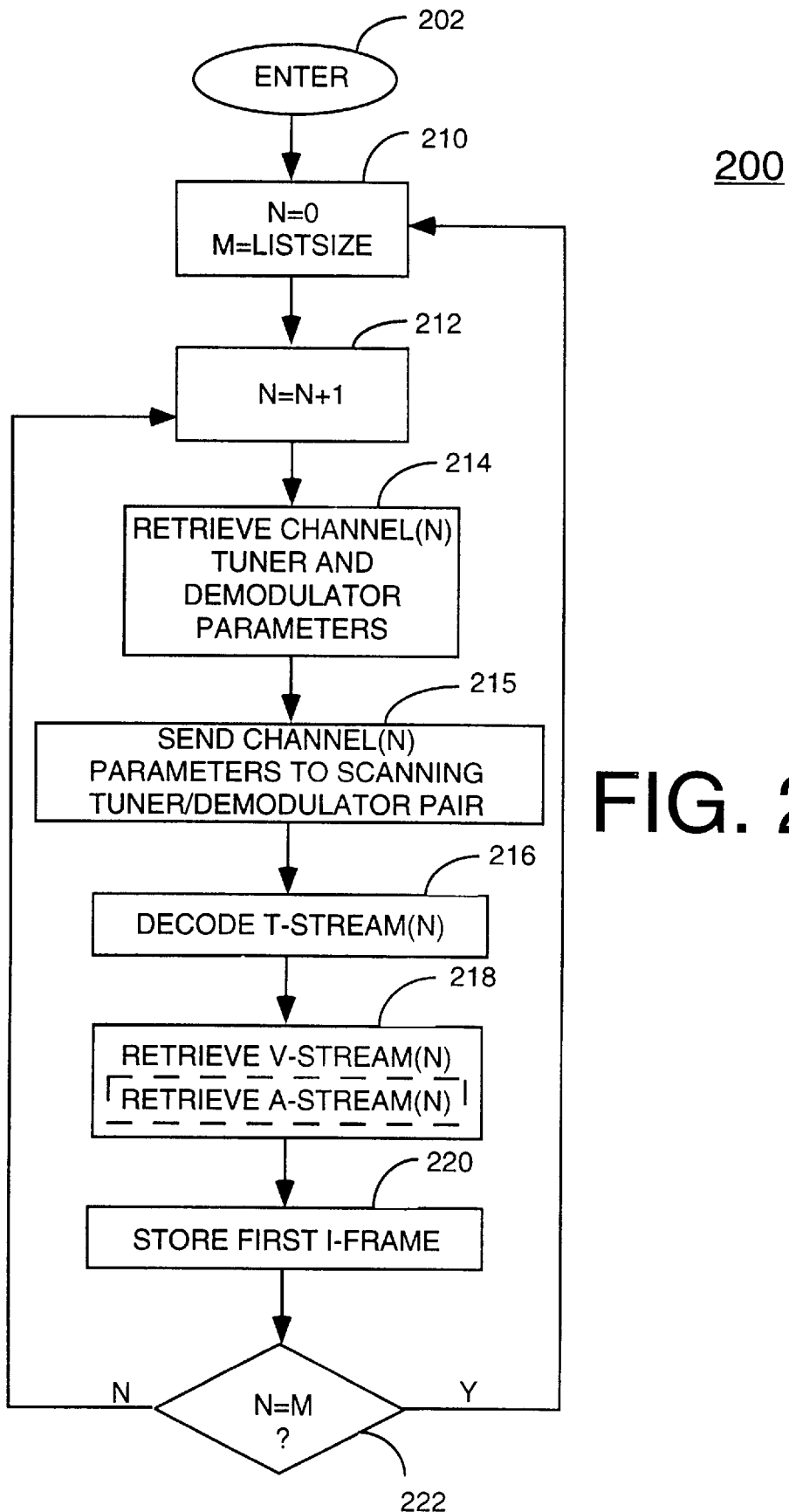
FIG. 2 depicts a flow diagram of a channel scanning routine according to the invention and suitable for use in the ATSC receiver of FIG. 1.

FIG. 2 depicts a flow diagram of a channel scanning routine 200 according to the invention and suitable for use in the ATSC receiver 100 of FIG. 1. Specifically, the channel scanning routine 200 is a portion of a system control routine (not shown) within controller 70 that controls various portions of the receiver 100. The channel scanning routine 200 operates as a "background," or "idle-state" routine. That is, the channel scanning routine 200 runs only when the system control routine in not active. For example, the system control routine may be in an idle state while waiting for a command from a user. Upon receiving a user command, the channel scanning routine 200 is terminated and a command servicing portion of the system controller routine is invoked. The channel scanning routine 200 utilizes information stored in a scan list 150 to retrieve at least an I-frame from the channels identified in the scan list. An exemplary scan list is depicted in Table 1.

The two tuner/demodulator pairs (10A/15A, 10B/15B) are both capable of functioning as either the main or auxiliary tuner/demodulator pairs due to the use of switch 20. Since one tuner/demodulator pair (i.e., the main tuner/demodulator pair) provides a system stream of a presently tuned channel to the main transport demultiplexer 35 (i.e., the presently tuned channel), controller 70 causes switch 20 to couple the output stream from the other tuner/demodulator pair (i.e., scanning tuner/demodulator pair) to the auxiliary demux and process unit 30.

The channel scanning routine 200 is entered at step 202, when the system control routine enters an idle state. The channel scanning routine 200 then proceeds to step 210, where an index variable N is initialized to zero, and a list size variable M is set equal to the number of channels stored in the scan list. In the exemplary embodiment, the scan list 150 comprises 12 channels as shown in Table 1 (i.e., four recent channels, four favorite channels and four channels proximately related to a currently selected channel). The index variable N is used to point to, and retrieve, information within the scan list pertaining to a particular (indexed) channel.

The channel scanning routine 200 proceeds from step 202 to step 212, where the index variable N is incremented by one. The routine 200 then proceeds to step 214, where the tuner parameters and demodulator parameters associated with the presently indexed channel are retrieved from the scan list 150. As previously noted, these parameters may also be stored in optional parameter memory 12. The routine then proceeds to step 215, where the retrieved parameters are coupled to the scanning tuner/demodulator pair (10A/15A or 10B/15B), which then begins to tune and demodulate the presently indexed channel.

The channel scanning routine 200 proceeds from step 215 to step 216, where, after some delay (i.e., carrier recovery, symbol recovery and the like), the auxiliary demux and processing unit 30 demultiplexes and decodes the program stream associated with the indexed channel from the received system stream (SO2). The routine then proceeds to step 218, where the elementary video stream and, optionally audio stream(s), associated with the indexed channel are retrieved from the program transport stream associated with the indexed channel. The routine then proceeds to step 220, where the first I frame encountered within the retrieved elementary video stream associated with the indexed channel is stored in memory unit 34. The routine then proceeds to step 222 where a query is made as to whether the index variable N is equal to the list size variable M. If the query at step 222 is answered negatively, then steps 214 through 22 are repeated (i.e., the next channel in the channel scan list is retrieved). If the query at step 222 is answered affirmatively, then steps 210 through 22 are repeated (i.e., the channel scan list is processed from the beginning).

The above-described channel scan routine 200 continually scans the channels stored in the scan list 150 to retrieve a recent I-frame for each channel and store the retrieved I-frame in a portion of memory 34 associated with that channel, thereby constructing an I-frame index of the scan list channels. In this manner, upon a determination that one of the scan list channels has been requested by a user, the stored I-frame associated with the requested channel can be immediately coupled to video decoder 45 to rapidly generate an image on the user's display screen. The rapid production of an image associated with the desired channel advantageously mimics the rapid (i.e., low latency) channel acquisition familiar to present-day consumers using NTSC television receivers.

Figure 3:
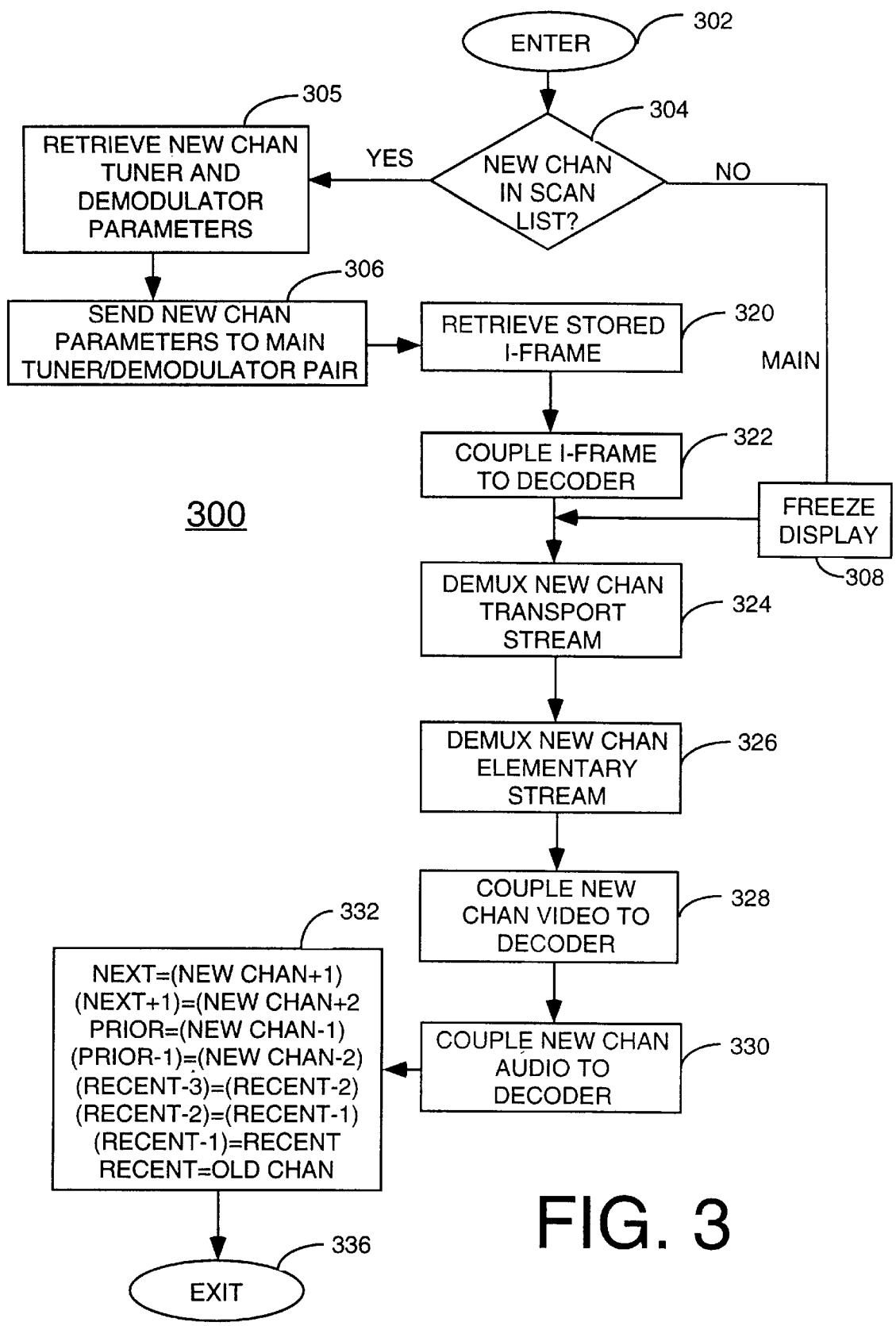
FIG. 3 depicts a flow diagram of a channel changing routine according to the invention and suitable for use in the ATSC receiver of FIG. 1.

FIG. 3 depicts a flow diagram of a channel changing routine 300 according to the invention and suitable for use in the ATSC receiver 100 of FIG. 1. Specifically, the channel changing routine 300 is a portion of the system control routine (not shown) within controller 70 that controls various portions of the receiver 100. The channel changing routine 300 is invoked in response to a user input indicative of a channel changing operation. The channel changing routine 300 will also cause the channel scanning routine 200 to terminate.

The channel changing routine 300 is entered at step 302, when a user input command indicative of a channel change operation is received by the controller 70. The routine 300 then proceeds to step 304, where a query is made as to whether the new channel is in the scan list.

If the query at step 306 is answered affirmatively, then the routine 300 proceeds to step 305, where the tuner and demodulator parameters associated with the new channel are retrieved from the scan list. The routine 300 then proceeds to step 306, where the retrieved tuner and demodulator parameters are coupled to the main tuner/demodulator pair (i.e., of the tuner/demodulator pair used to produce system stream SO1). This causes the main tuner/demodulator pair to begin the process of producing a valid system stream including the channel of interest (i.e., the new channel). The routine then proceeds to step 320, where the controller 70 causes the auxiliary demux and processing unit 30 to retrieve from memory 34 the I-frame associated with the desired new channel. The routine 300 then proceeds to step 322, where the retrieved I-frame is coupled to decoder 45 via switch 40. Decoder 45 will decode the I-frame and couple it to format converter 50, where the I-frame will be stored in display frame buffer 55. The frame buffer-stored I-frame will produce a still image on the display device (not shown). If necessary (i.e., if the retrieved I-frame was processed by optional resize and compress unit 32), format converter 50 will convert the retrieved I-frame to a format suitable for use by the video driver and display. The routine 300 then proceeds to step 324.

If the query at step 304 is answered negatively, i.e., the desired new channel does not correspond to any of the channels presently indexed in the scan list, the routine 300 proceeds to step 308. At step 308, the frame present is the display frame buffer 55 of format converter 50 is used to provide a still image (i.e., the presently-displayed or "old" channel is simply frozen on the screen). The routine 300 then proceeds to step 324.

At step 324 the controller 70 causes the main transport demultiplexer 35 to demultiplex the program transport stream associated with the desired new channel from the system stream SO1 produced by the main tuner/demodulator pair (identified at step 304). The routine then proceeds to step 326, where the elementary streams associated with the desired new channel are retrieved form the transport program stream. The routine then proceeds to step 328, where the video elementary stream associated with the new channel is coupled to decoder 45 via switch 40. The routine 300 then proceeds to step 330, where the audio elementary stream(s) associated with the desired new channel is coupled to audio decoder 60.

After the elementary video (step 328) and elementary audio (step 330) streams have been coupled to respective video (45) and audio (60) decoders, the routine 300 proceeds to step 332. At step 332, the scan list is updated to reflect the new channel information. Specifically, information identifying the channel ID, tuner frequency, program transport stream PID, video elementary stream PID and audio elementary stream PID is updated for the "recent," "next" and "prior" channels as follows. The "recent–3" information is discarded, the "recent–2" information is stored in the "recent–3" location, the "recent–1" information is stored in the "recent–2" location, the "recent" information is stored in the "recent–1" location and information relating to the "old" or "previously-tuned" channel is stored in the "recent" storage locations. Additionally, information relating to the two channels incrementally above the new channel (i.e., "next" and "next+1") and information relating to the two channels incrementally below the new channel (i.e., "prior" and "prior–1") are stored in the scan list 150.

An additional feature of the invention is a PIP "swap" mode of operation. As previously described, first switch 20, in response to a control signal SW from the controller 70, couples one of the first and second system streams SA, SB to a first output O1 as a first output stream SO1, and one of the first and second system streams SA, SB to a second output O2 as a second output stream SO2. In the PIP mode of operation, the system stream coupled to first output O1 is utilized by the main transport demultiplexer 35, and related circuitry, to produce a video signal V4 used to generate a main image on a display. Similarly, the system stream coupled to second output O2 is utilized by the auxiliary demux and processing unit 30, and related circuitry, to produce a video signal V2 used to generate an auxiliary (i.e., PIP) image. In the PIP swap mode of operation, first switch 20, in response to a control signal SW1 from the controller 70, swaps the system streams coupled to outputs O1 and O2. That is, the system stream coupled to output O1 prior to entering the PIP swap mode is coupled to output O2 upon entering the PIP swap mode. Similarly, the system stream coupled to output O2 prior to entering the PIP swap mode is coupled to output O1 upon entering the PIP swap mode. The on-screen effect is a swapping of the main and PIP images. The PIP swap operation is very fast, because the system streams swapped by first switch 20 are already available (i.e., there is no tuning or demodulation delay).

An additional feature of the invention is the ability to produce a scanning channel "mosaic" or image tile. Specifically, the auxiliary demux and processing unit 30 utilize optional resize and compression unit 32 to compress each I-frame such that a compressed I-frame, when displayed, will occupy, e.g., 1/12th of an image. In this manner, all 12 channels in the scan list 150 may be displayed together in a multiple PIP, or image-tile arrangement. The image-tile may be updated each time an individually stored I-frame is updated. Such an image-tile arrangement may contain four, nine, 12, 16 or some other convenient number of images. Known no-screen selection methods may be used to select a particular "tile" for viewing as a full size (i.e., main) image.

Although various embodiments which incorporate the teachings of the present invention have been shown and described in detail herein, those skilled in the art can readily devise many other varied embodiments that still incorporate these teachings.

What is claimed is:

1. A method for masking program selection latency in an MPEG-like information stream receiver, comprising the steps of:

retrieving, using a first tuner/demodulator pair, a selected information stream, said selected information stream being coupled to a decoder;

retrieving, in a scanning mode of operation using a second tuner/demodulator pair, at least a portion of each of a plurality of predefined information streams, each information stream being associated with a program;

storing, in said scanning mode of operation, each of said retrieved portions of said plurality of predefined information streams in a memory;

comparing, in a program selection mode of operation, identification indicium of a desired information stream to identification indicia of said plurality of predefined information streams; and in the case of a favorable comparison of said indicia:

initiating an information stream selection process, said selection process producing, after a delay time, said desired information stream;

retrieving, from said memory, the stored portion of the information stream comparing favorably to the desired information stream;

coupling, to said decoder, said retrieved information stream portion; and coupling, to said decoder, said desired information stream resulting from said information stream selection process.

2. The method of claim 1, further comprising, in the case of a favorable comparison of said indicia, the steps of:

decoding an audio portion of said desired information stream to produce an audio information stream, said step of audio portion decoding preceding a video portion decoding step; and coupling said audio information stream to an audio decoder.

3. The method of claim 1, wherein:

said information stream comprises a program transport stream comprising at least a video elementary stream; and said retrieved and stored portions comprise intra-frame encoded video frames (I-frames) included within said video elementary stream.

4. The method of claim 1, wherein said step of retrieving a predefined information stream in said scanning mode of operation comprises the steps of:

tuning a radio frequency (RF) carrier signal associated with said predefined information stream to produce an intermediate frequency (IF) carrier signal;

demodulating said IF carrier signal to produce a system stream including said predefined information stream;

demultiplexing said system stream to retrieve a program transport stream comprising said predefined information stream; and extracting, from said program transport stream, a portion of an elementary stream included within said program transport stream.

5. The method of claim 4, wherein said step of extracting comprises the steps of:

parsing said program transport stream until an indicium of a predetermined type of information frame is detected in an information packet within said program transport stream; and extracting said information packets associated with said detected information frame.

6. The method of claim 5, wherein said predetermined type of information frame comprises an intra-frame encoded video information frame.

7. The method of claim 4, wherein said stream is modulated onto said carrier according to either a vestigial sideband (VSB) modulation or quadrature amplitude modulation (QAM) technique.

8. The method of claim 1, wherein said step of retrieving, in said scanning mode of operation, includes the steps of:

retrieving, from at least one of a tuner and a demodulator, parameters associated with tuning or demodulating a carrier signal including said information stream; and storing said retrieved tuning or demodulating parameters.

9. The method of claim 8, wherein said step of initiating, in said program selection mode of operation, includes the steps of:

recalling stored tuning or demodulating parameters associated with said desired information stream; and coupling said recalled tuning or demodulating parameters to an appropriate tuner or demodulator.

10. The method of claim 9, further including, in the case of an unfavorable comparison with respect to identification indicium, the steps of:

comparing at least a tuning parameter of said desired channel to tuning parameters associated with said plurality of predefined information streams; and in the case of a favorable comparison:

recalling, from said memory, stored tuning parameters associated with said information stream comparing favorably with said desired channel; and coupling said recalled tuning parameters to an appropriate tuner or demodulator.

11. In a television receiver, apparatus for rapidly changing channels comprising:

a first channel selector, for selecting a first channel from a plurality of available channels;

a decoder, coupled to said first channel selector, for decoding an information stream associated with said selected first channel to produce a decoded information stream;

a second channel selector, for sequentially selecting each of a plurality of identified channels within a list of channels to be scanned, each of said plurality of identified channels being associated with a respective information stream, a channel identifier and a channel tuning parameter; and a processor, coupled to said second channel selector and said decoder, for storing in a memory and retrieving at least a portion of said respective information streams associated with said sequentially selected channels;

wherein, in a channel changing mode of operation:

said processor, in response to a desired new channel comprising one of said plurality of listed channels, coupling to said decoder said stored portion of said information stream associated with said one listed channel;

said first channel selector selects said desired channel as said first channel; and said decoder, in response to said information stream associated with said desired channel being valid, begins decoding said first information stream.

12. The apparatus of claim 11, wherein said first and second channel selectors comprise respective first and second tuner/demodulator pairs for tuning a respective RF carrier frequencies and demodulating respective information streams modulated onto said respective RF carrier frequencies to produce respective first and second system streams.

13. The apparatus of claim 12, wherein said list of channels to be scanned includes tuner and demodulator parameters associated with each listed channel, said tuner and demodulator parameters being coupled to said second tuner/demodulator pair during a channel scanning mode of operation.

14. The apparatus of claim 13, wherein, in said channel changing mode of operation:
  said processor, in response to said desired new channel comprising one of said plurality of identified channels, couples to said first tuner/demodulator pair tuner and demodulator parameters associated with said one of said plurality of identified channels.

15. The apparatus of claim 11, wherein:
  said processor comprises a picture-in-picture (PIP) processor operating in either said channel scanning mode of operation or in a PIP mode of operation;
  said PIP processor, in said PIP mode of operation, extracting only intra-frame encoded portions of only a single channel and coupling said extracted intra-frame encoded portions of said single channel to an output.

16. In a receiver, apparatus for changing channels comprising:
  a first tuner/demodulator pair, for tuning a desired RF carrier frequency and demodulating an information stream modulated onto said RF carrier frequency to produce a first system stream;
  a second tuner/demodulator pair, for tuning a desired RF carrier frequency and demodulating an information stream modulated onto said RF carrier frequency to produce a second system stream;
  a main demultiplexer, selectively coupled to one of said first and second tuner/demodulator pairs, for extracting and coupling to an output a video stream associated with a main channel from one of said first and second system streams;
  an auxiliary demultiplexer, selectively coupled to one of said first and second tuner/demodulator pairs, for repetitively extracting and storing a portion a video stream associated with at least one auxiliary channel from one of said first and second system streams; and
  a video decoder, selectively coupled to one of said main and auxiliary demultiplexers, for decoding video information provided by one of said main and auxiliary demultiplexers to produce an output video stream; wherein
  in a channel scanning mode of operation:
    said video decoder is coupled to said main demultiplexer; and
  in a channel change mode of operation:
    said tuner/demodulator pair producing said system stream associated with said main channel is adjusted to produce a system stream associated with a desired channel,
    said auxiliary demultiplexer retrieves, if available, and couples to an output, a portion a video stream associated with said desired channel, and
    said video decoder is coupled to said auxiliary demultiplexer until said main demultiplexer begins producing a valid video information stream associated with said desired channel.

17. The apparatus of claim 16, wherein said auxiliary demultiplexer comprises a picture-in-picture (PIP) processor operating in either said channel scanning mode of operation or in a PIP mode of operation.

18. The apparatus of claim 17, further comprising:
  a switch, coupled to said first and second tuner demodulator pairs, and to said main demultiplexer and PIP processor, for coupling a one of said first and second system streams to said main demultiplexer, and for coupling another one of said first and second system streams to said PIP processor;
  said switch, upon entering a PIP swap mode of operation, coupling said one of said first and second system streams to said PIP processor, and coupling said another one of said first and second system streams to said main demultiplexer.

19. The apparatus of claim 18, wherein said PIP processor extracts only I-frames from said video stream associated with at least one auxiliary channel.

20. The apparatus of claim 19, wherein said PIP processor further comprises:
  a resize and compression unit, coupled to said decoder, for decoding said extracted I-frames to produce a sequence of video frames and for reducing the amount of information included in said sequence of video frames, to produce a sequence of video frames representative of a size-reduced video image;
  said PIP processor, in said PIP mode of operation, extracts said plurality of I-frames from only a single auxiliary channel, and provides an output video stream comprising said sequence of video frames representative of a size-reduced video image.

21. The apparatus of claim 19, wherein said PIP processor, in said scanning mode of operation, repetitively extracts one I-frames from each of a plurality of auxiliary channels, said auxiliary channels being identified in a list of channels to be scanned.

22. The apparatus of claim 21, wherein said list of channels to be scanned includes tuner and demodulator parameters associated with each listed channel, said tuner and demodulator parameters being coupled to said tuner/demodulator pair producing said system stream associated with said auxiliary channel.

* * * * *